(12) United States Patent
Zhao (10) Patent No.: US 10,270,963 B2
(45) Date of Patent: Apr. 23, 2019

(54) ANGLE SWITCHING METHOD AND APPARATUS FOR IMAGE CAPTURED IN ELECTRONIC TERMINAL

(71) Applicant: TENCENT TECHNOLOGY (SHENZHEN) COMPANY LIMITED, Shenzhen (CN)

(72) Inventor: Na Zhao, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 23 days.

(21) Appl. No.: 15/699,911

(22) Filed: Sep. 8, 2017

(65) Prior Publication Data

US 2017/0374278 A1 Dec. 28, 2017

Related U.S. Application Data

(63) Continuation of application No. PCT/CN2016/089979, filed on Jul. 14, 2016.

(30) Foreign Application Priority Data

Aug. 27, 2015 (CN) .......................... 2015 1 0535243

(51) Int. Cl.
*H04N 5/232* (2006.01)
*H04N 7/14* (2006.01)
*H04N 5/262* (2006.01)

(52) U.S. Cl.
CPC ..... *H04N 5/23219* (2013.01); *H04N 5/23229* (2013.01); *H04N 5/23293* (2013.01); *H04N 5/2621* (2013.01); *H04N 7/147* (2013.01)

(58) Field of Classification Search
CPC ............... H04N 5/2258; H04N 5/2259; H04N 5/23216; H04N 13/366–13/383;
(Continued)

(56) References Cited

U.S. PATENT DOCUMENTS

2005/0257748 A1 11/2005 Kriesel et al.
2013/0141605 A1* 6/2013 Kim ..................... H04N 1/3872
348/222.1

(Continued)

FOREIGN PATENT DOCUMENTS

CN 101431640 A 5/2009
CN 102638653 a 8/2012
(Continued)

OTHER PUBLICATIONS

The World Intellectual Property Organization (WIPO) International Search Report for PCT/CN2016/089979 dated Oct. 20, 2016 pp. 1-5.

*Primary Examiner* — Paul M Berardesca
(74) *Attorney, Agent, or Firm* — Anova Law Group, PLLC (57) ABSTRACT

This application relates to an angle switching method and apparatus for an image captured in an electronic terminal. In one embodiment, an angle switching method for an image captured in an electronic terminal includes the following steps: receiving a triggering operation on a specified switching button; switching an angle on an image captured by a camera of the terminal within a specified angle range to an image area; and displaying the image captured by the camera of the current terminal at an angle after the switching.

17 Claims, 4 Drawing Sheets

(58) Field of Classification Search
CPC ........... H04N 5/23218; H04N 5/23219; H04N 5/2621; H04N 5/2628; G02B 3/0056; G06T 15/00–15/87; G06T 2200/04; G06T 2200/08; G06T 2207/10028
See application file for complete search history.

(56) References Cited

U.S. PATENT DOCUMENTS

| | | | |
|---|---|---|---|
| 2014/0098296 A1* | 4/2014 | Arora | G06T 15/20 |
| | | | 348/580 |
| 2014/0368495 A1* | 12/2014 | Wei | H04N 13/161 |
| | | | 345/419 |
| 2018/0107863 A1* | 4/2018 | Wang | H04N 5/232 |

FOREIGN PATENT DOCUMENTS

| | | | |
|---|---|---|---|
| CN | 103491302 A | 1/2014 | |
| CN | 104243961 A | 12/2014 | |
| CN | 104685544 A | 6/2015 | |

* cited by examiner

ANGLE SWITCHING METHOD AND APPARATUS FOR IMAGE CAPTURED IN ELECTRONIC TERMINAL

RELATED APPLICATION

This application is a continuation application of PCT Application No. PCT/CN2016/089979, filed on Jul. 14, 2016, which claims priority to Chinese Patent Application No. 201510535243.X, entitled "ANGLE SWITCHING METHOD AND APPARATUS FOR IMAGE CAPTURED IN ELECTRONIC TERMINAL," filed with the Patent Office of China on Aug. 27, 2015. The two aforementioned applications are incorporated by reference in the entirety.

FIELD OF THE TECHNOLOGY

This application relates to the field of Internet communication technologies, and in particular, to an angle switching method and apparatus for an image captured in an electronic terminal.

BACKGROUND OF THE DISCLOSURE

As computers and other devices become more popular, an increasing number of users capture their real-time images by using electronic terminals such as mobile phones and computers or perform communication by means of video sessions. Often, if a user wants to view an image captured by an electronic terminal at a better angle, the user usually adjusts to a better angle by changing a position of a camera of the electronic terminal. However, it is usually very inconvenient to manually change the position of the camera. If a position of a camera of a mobile phone is adjusted, it is likely that a display interface cannot be seen by the user from that angle. Therefore, changing an angle of an image captured by the camera without changing the position of the camera is a problem that needs to be resolved.

SUMMARY

This application provides an angle switching method and apparatus for an image captured in an electronic terminal, so as to change a display angle of an image captured by a camera without changing a position of the camera.

In one embodiment, an angle switching method for an image captured in an electronic terminal includes the following steps: receiving a triggering operation on a specified switching button; switching an angle on an image captured by a camera of the terminal within a specified angle range to an image area; and displaying the image captured by the camera of the current terminal at an angle after the switching.

The embodiments of this application further provide an angle switching apparatus for an image captured in an electronic terminal. The angle switching apparatus for an image captured in an electronic terminal, includes a processor and a memory, the memory storing an application program module that can be executed by the processor, when executed by the processor, the application program performs an angle switching method. The method includes receiving a triggering operation input on a specified switching button; switching an angle on an image captured by a camera of a current terminal within a specified angle range according to an image area; and displaying the image captured by the camera of the current terminal at an angle after the switching.

In order to make the foregoing and other objectives, features, and advantages of this application more comprehensible, preferred embodiments are described in detail below with the accompanying drawings

DESCRIPTION OF EMBODIMENTS

In further explain technical means adopted in this application for achieving predetermined inventive objectives and effects thereof, specific implementations, structures, features, and effects of this application are explained below in detail with reference to the accompanying drawings and embodiments.

An angle switching method and apparatus for an image captured in an electronic terminal provided by the embodiments of this disclosure may be applied to an electronic terminal.

Figure 1:
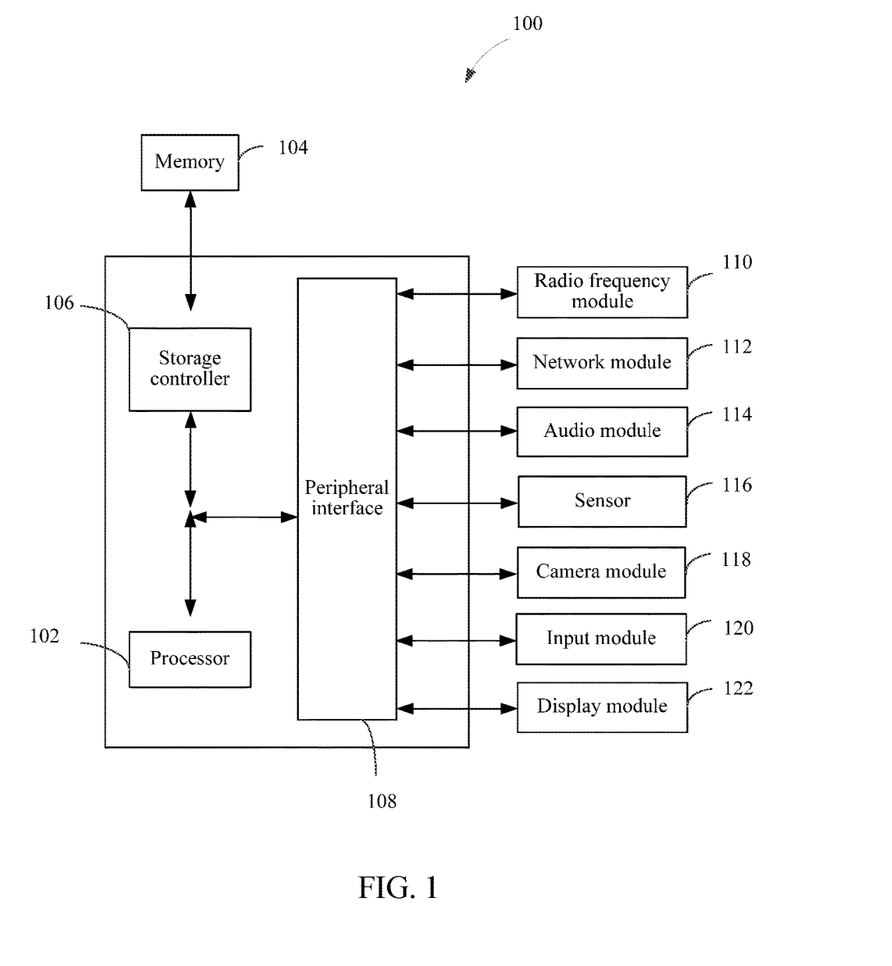
FIG. 1 shows a structural block diagram of an electronic terminal.

FIG. 1 shows a structural block diagram of an electronic terminal. As shown in FIG. 1, an electronic terminal 100 includes one or more (only one is shown in the figure) processors 102, a memory 104, a storage controller 106, a peripheral interface 108, a radio frequency (RF) module 110, a network module 112, an audio module 114, a sensor 116, a camera module 118, an input module 120, and a display module 122. It may be understood by a person of ordinary skill in the art that the structure shown in FIG. 1 is merely illustrative instead of limiting a structure of the electronic terminal 100. For example, the electronic terminal 100 may further include components more or less than those shown in FIG. 1 or have a structural configuration different from that shown in FIG. 1. A specific instance of the foregoing electronic terminal 100 includes, but is not limited to, any combination of a handheld computer, a mobile phone, a media player, an on-board device, a personal digital assistant, and the foregoing apparatus.

It could be understood by a person of ordinary skill in the art that for the processor 102, all other components are peripheral devices, and the processor 102 are coupled to the peripheral devices through a plurality of peripheral interfaces 108. The peripheral interface 108 may be implemented based on the following standards, a Universal Asynchronous Receiver/Transmitter (UART), General Purpose Input/Output (GPIO), a Serial Peripheral Interface (SPI), an Inter-Integrated Circuit (I2C), but is not limited to the foregoing standards. In some instances, the peripheral interface 108 may only include a bus. In some other instances, the peripheral interface 108 may further include another element, such as one or more controllers, for example, a display controlled configured to connect to a liquid crystal display panel or a storage controller 106 configured to connect to a memory. In addition, the controllers may also be separated from the peripheral interface 108 and integrated inside the processor 102 or a corresponding peripheral device.

The memory 104 may be configured to store a software program and a module such as a program instruction/module corresponding to an angle switching method/apparatus for an image captured in an electronic terminal in an embodiment of this application. The processor 102 performs various functional applications and data processing by running a software program and a module stored in the memory 104, that is, implementing the foregoing angle switching method for an image captured in an electronic terminal. The memory 104 may include a high-speed random memory, and may also include a non-volatile memory such as one or more magnetic storage devices, a flash memory, or another non-volatile solid-state memory. In some instances, the memory 104 may further include a memory that is remotely disposed relative to the processor 102, and the remote memory may be connected to the electronic terminal 100 through a network. Instances of the network include, but are not limited to, the Internet, an intranet, a local area network, a mobile communications network, and a combination thereof.

The radio frequency module 110 is configured to receive and send an electromagnetic wave, and implement mutual conversion between the electromagnetic wave and an electric signal, so as to communicate with a communications network or another device. The radio frequency module 110 may include various existing circuit elements for performing these functions, such as an antenna, an RF transceiver, a digital signal processor, a cipher/decipher chip, a subscriber identity module (SIM) card, and a memory. The RF module 110 may communicate with various networks such as the Internet, an intranet and a wireless network, or communicate with other devices through a wireless network. The wireless network may include a cellular telephone network, a wireless local area network, or a metropolitan area network. The wireless network may use various communications standards, protocols, and technologies, which include, but are not limited to, Global System for Mobile Communication (GSM), Enhanced Data GSM Environment (EDGE), Wideband Code Division Multiple Access (W-CDMA), Code Division Multiple Access (CDMA), Time Division Multiple Access (TDMA), Wireless Fidelity (WiFi) (for example, US Institute of Electrical and Electronic Engineers IEEE 802.11a, IEEE 802.11b, IEEE 802.11g and/or IEEE 802.11n), Voice over Internet Protocol (VoIP), Worldwide Interoperability for Microwave Access (Wi-Max), other protocols for email, instant messaging and short message service, and any other suitable communications protocols, and even may include some protocols that have not been developed.

The network module 112 is configured to receive and send a network signal. The network signal may be a wireless signal or a wired signal. For example, the network signal is a WiFi signal. Because a working frequency of WiFi also falls within an RF band, the network module may have a hardware structure similar to that of the RF module 110, that is, including elements such as an antenna, an RF transceiver, a digital signal processor, and a cipher/decipher chip. For example, the foregoing network signal is a wired network signal. At this moment, the network module 112 may include elements such as a processor, a random memory, a converter, and a crystal oscillator.

The audio circuit 114, a loudspeaker, a sound jack, and a microphone may together provide audio interfaces between a user and the electronic terminal 100. Specifically, the audio circuit 114 receives sound data from the processor 102, converts the sound data into an electric signal, and transmits the electric signal to the loudspeaker. The loudspeaker converts the electric signal into an acoustic wave audible to the human ear. The audio circuit 114 further receives an electric signal from the microphone, converts the electric signal into sound data, and transmits the sound data to the processor 102 for further processing. Audio data may be obtained from the memory 104 or by using the RF module 110 and the network module 112. In addition, the audio data may also be stored in the memory 104 or sent by using the RF module 110 and the network module 112.

An instance of the sensor 116 includes, but is not limited to, an optical sensor, an operation sensor, and other sensor. Specifically, the optical sensor may include an ambient light sensor and a proximity sensor. The ambient light sensor may sense brightness of ambient light, so that some modules executed by the processor 102 may automatically adjust output of display by using output of the ambient light sensor. The proximity sensor may switch off the display output when the electronic terminal 100 is moved to the ear. As one type of motion sensor, a gravity acceleration sensor can detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, and a thermometer, which may be configured in the electronic terminal 400, are not further described herein.

The camera module 118 is configured to capture a picture or video. The captured picture or video may be stored in the memory 104, and may be sent by using the RF module 110. The camera module 118 may specifically include components such as a lens module, an image sensor, and a flashlight. The lens module is configured to form an image of an photographed object and maps the formed image to the image sensor. The image sensor is configured to receive a light ray from the lens module to sense light, so as to record image information. Specifically, the image sensor may be implemented based on a Complementary Metal Oxide Semiconductor (CMOS), a Charge-coupled Device (CCD), or another image sensing principle. The flashlight is configured to perform exposure compensation during photographing. Generally, the flashlight applied to the electronic terminal 100 may be a Light Emitting Diode (LED) flashlight.

The input module 120 may be configured to receive input character information, and generate a keyboard, mouse, joystick, optical, or track ball signal input related to the user setting and function control. Specifically, the input module 120 may include a key and a touch control surface. For example, the key may include a character key configured to input a character and a control key configured to trigger a control function. Instances of the control key include a "Home" key, a power-on/off key, a camera key. The touch control surface may capture a touch operation of a user on or near the touch control surface (such as an operation of a user on or near the touch control surface by using any suitable object or accessory such as a finger or a stylus), and drive a corresponding connection apparatus according to a preset program. Optionally, the touch control surface may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 102. Moreover, the touch controller can receive and execute a command sent from the processor 102. In addition, the touch control surface may be a resistive, capacitive, infrared, or surface sound wave type touch control surface. In addition to the touch control surface, the input unit 120 may further include another input device. Specifically, the input device may include, but is not limited to, one or more of a physical keyboard, a track ball, a mouse, and a joystick.

The display module 122 may be configured to display information input by the user or information provided for the user, and various graphical user interfaces of the electronic terminal 100. The graphical user interfaces may be formed by a graph, text, an icon, a video, or any combination thereof. For example, the display module 122 includes a display panel. For example, the display panel may be a liquid crystal display (LCD) panel, an organic light-emitting diode (OLED) display panel, an Electro-Phoretic Display (EPD) panel, or the like. Further, the touch control surface may be disposed on the display panel to form one piece together with the display panel. In some other embodiments, the display module 122 may further include a display apparatus of another type, for example, include a projection display apparatus. Compared with a common display panel, the projection display apparatus also need to include some components for projection, such as a lens assembly.

The foregoing software program and module include an operating system and an angle switching module for an image captured. In the embodiments of this application, for example, the operating system may be LINUX, UNIX, WINDOWS, or mobile operating system such as Android or IOS, may include various software components and/or drives for managing system tasks (such as memory management, storage device control, and power supply management), and may mutually communicate with various hardware or software components, so as to provide a running environment for other software components. The angle switching module for an image captured runs on the basis of the operating system and is configured to switch a display angle of an image captured by a camera in the electronic terminal 100.

In embodiments of the present disclosure, a user may use the camera module 118 to take a photo. The user may review the photo on the display module 122 and use the input module 120 to select an option to adjust the angle of the photo. The image angle switching application may be a software application stored in memory 104 and executed by processor 102. The user may interact with the angle switching application through the input module 120. Once the angle of the subject in the photos is adjusted, the display module 122 may display the photo at the adjusted viewing angle.

Figure 2:
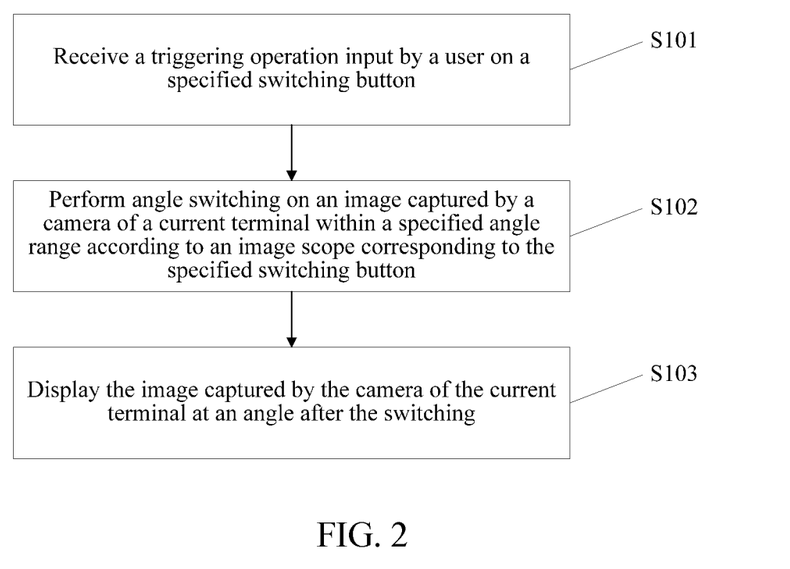
FIG. 2 is a flowchart of an angle switching method for an image captured in an electronic terminal according to an embodiment.

FIG. 2 is a flowchart of an angle switching method for an image captured in an electronic terminal according to an embodiment of this application, and as shown in FIG. 2, the method in this embodiment may include the following steps:

Step S101. Receive a triggering operation input by a user on a specified switching button.

The method of this embodiment may be used to adjust a video angle when a current terminal takes a photo or records a video, or may be used to adjust a video angle when video communication is performed (e.g., a video call) by using an instant message tool.

In one embodiment, the receiving a triggering operation input by a user on a specified switching button includes: receiving a triggering operation for displaying options; and receiving a selection from the options, where the options include at least two options. Specifically, an option, such as "Image angle switching", may be added to a corresponding display interface, and after receiving an triggering operation of the user for selecting this option, the display interface further displays at least two operations, such as at least two options (e.g., a first option, a second option, and a third option).

For example, the first option may be an option for switching a display angle of a face image captured by the camera. For example, the first option may be displayed as "Face angle". The second option may be an option for switching a display angle of the entire image captured by the camera. For example, the second option may be displayed as "Panoramic angle". The third option for switching a display angle of a area selected by the user in the image captured by the camera. For example, the third option may be displayed as "Angle of self-selected area".

Step S102: Perform angle switching on an image captured by a camera of a current terminal within a specified angle range according to an image area corresponding to the specified switching button.

Specifically, the angle switching may be angle switching between a plane captured by the camera and a vertical plane.

In this embodiment, the image captured by the camera is an instant display of a real time display image captured by the camera.

Specifically, if the first option, selected by the user, for switching a display angle of a face image captured by the camera is received, angle switching is performed on the display angle of the face image captured by the camera within a first specified angle range. For example, the first specified angle range may be a range of 0 to 45 degrees. Specifically, the display angle may be switched along a face direction, for example, an angle between a display plane along a direction from the forehead to the chin of a face and a vertical plane.

In some embodiments, the electronic terminal may have a camera that can capture three dimensional images (360° images). In this case, the camera application may include functions to enable a user to view the captured image at a selected angle. In some embodiments, the electronica terminal may host an image processing application with stored facial image data and facial image template. The facial image data may be collected from the facial image data captured by the camera of the electronic terminal. The facial image data may also be uploaded from other devices. The facial image templates may be a template of a person or certain type of persons' face shape calculated based on facial image data. Based on an image captured by the camera, the image processing application may simulate the captured image from a selected angle that is different from the original image capturing angle. That is, the image processing system may calculate the simulated images based on the captured image, the facial images data and facial image templates in its database.

Specifically, if the second option or the third option selected by the user are received, angle switching on the image captured by the camera of the current terminal is performed within a second specified angle range according to the image area corresponding to the specified switching button. For example, the second specified angle range may be a range of 0 to 180 degrees. Specifically, the switching direction may be a forward direction along a display image or a direction vertical to the forward direction of the display image.

Step S103: Display the image captured by the camera of the current terminal at an angle after the switching.

Specifically, if the method of this embodiment is applied to photographing or video recording of the current terminal, the display image of the current terminal displays an image captured by the camera of the current terminal after the switching.

Specifically, if the method of this embodiment is applied to a case in which the image captured by the camera of the current terminal is captured in a video session form, the displaying the image captured by the camera of the current terminal at an angle after the switching includes: displaying, by the current terminal, the image captured by the camera of the current terminal at the angle after the switching, and enabling a video receiving terminal of the video session to display the image captured by the camera of the current terminal at the angle after the switching, for example, the current terminal may directly send the image after the switching to the video receiving terminal of the video session for display.

For example, when taking a selfie by using an electronic terminal, a user A usually raises an arm to from an angle of 45 degrees to a horizontal plane, and the angle of 45 degrees is a photographing angle at which the face seems smaller, and an image is not distorted. After receiving a triggering operation of the user A on a specified switching button, angle switching is performed on an image captured by the camera within the specified angle range. In another instance, when a user B and a user C conduct a video call, after receiving a triggering operation of the user B on a specified switching button, a terminal corresponding to the user B performs angle switching on a corresponding image captured by the terminal corresponding to the user B within the specified angle range. Further, a display interface of the terminal corresponding to the user B correspondingly displays an image after the angle switching, a display interface of a terminal corresponding to the user C also displays an image after the angle switching is performed on the image captured by the terminal corresponding to the user B.

According to the method of this embodiment, adjusting an angle of an image captured by the camera without changing a position of the camera enables a user to adjust a display angle of an image without affecting a viewing angle of the image, which improves the user experience.

Figure 3:
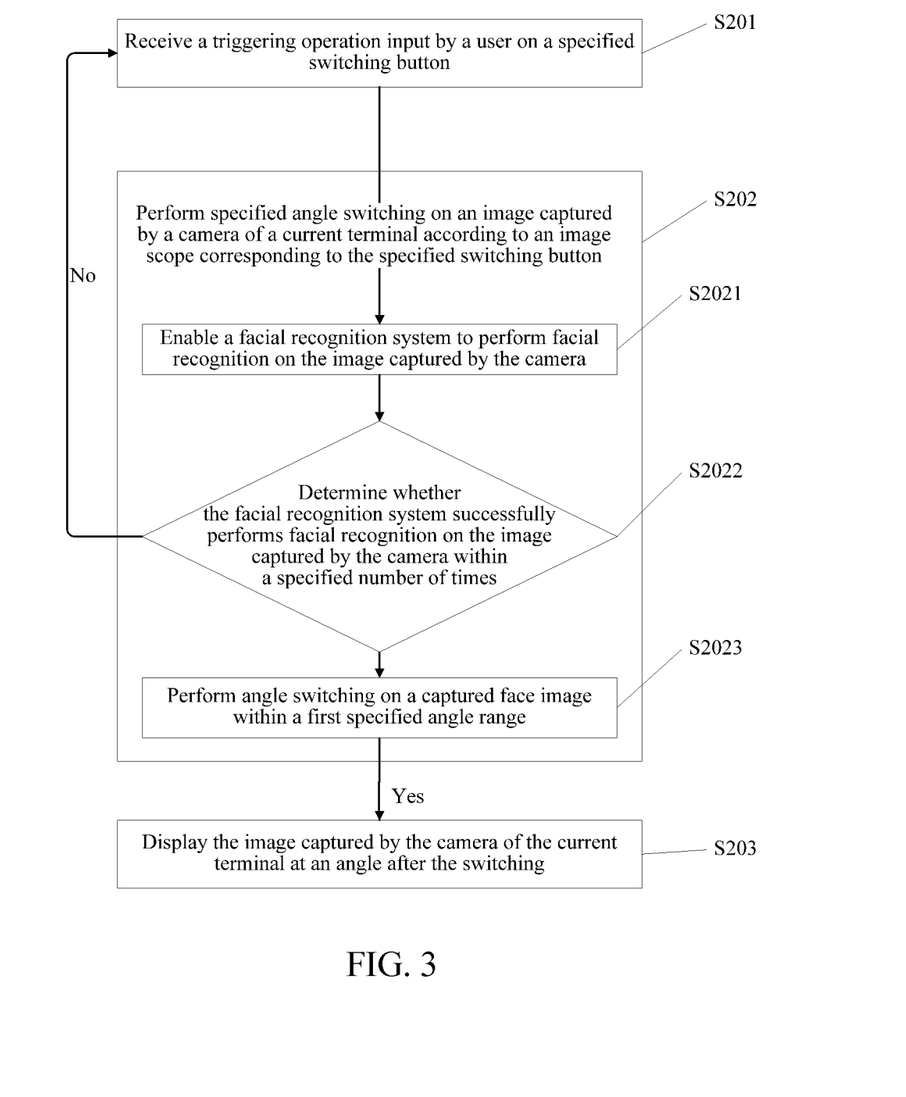
FIG. 3 is a flowchart of an angle switching method for an image captured in an electronic terminal according to another embodiment.

FIG. 3 is a flowchart of an angle switching method for an image captured in an electronic terminal according to another embodiment of this application, and as shown in FIG. 3, the method in this embodiment may include the following steps:

Step S201. Receive a triggering operation input by a user on a specified switching button.

In one embodiment, step S201 specifically includes: receiving a triggering operation of the user for displaying options; and receiving a selection from the options, where the options include at least two options.

Further, the options include a first option for switching a display angle of a face image captured by the camera, a second option for switching a display angle of the entire image captured by the camera, and a third option for switching a display angle of an area selected by the user in the image captured by the camera.

Step S202: Perform specified angle switching on an image captured by a camera of a current terminal according to an image area corresponding to the specified switching button.

If the user selects the first operation for switching a display angle of a face image captured by the camera, step S202 includes:

Sub-step S2021: Enable a facial recognition system to perform facial recognition on the image captured by the camera.

Sub-step S2022: Determine whether the facial recognition system successfully performs facial recognition on the image captured by the camera within a specified number of times.

If it is determined that facial recognition succeeds within a specified number of time, sub-step S2023 is performed, and if it is determined that facial recognition fails within a specified number of times, step S201 is performed.

For example, the facial recognition system may perform face image detection on the image captured by the camera, and if no face image is detected from the image within a specified number of times, the facial recognition system may determine that there is no face image in the image. Step S201 may be performed again. For example, the specified number of times may be two times, three times, or the like.

Sub-step S2023. Perform angle switching on a captured face image within a first specified angle range.

Specifically, angle switching is performed on the detected face image within a first specified angle range. Because if the switched angle of the face image is excessively large, it is likely that the shape of the face cannot be seen, the first specified angle range may be a relatively small angle range, such as a range of 0 to 45 degrees.

Further, after angle switching is performed on the captured face image within the first specified angle range, an environment image around the face image is also switched to an angle the same as that to which the face image is switched, so that the image looks more natural.

Step S203. Display the image captured by the camera of the current terminal at an angle after the switching.

In embodiments of the present disclosure, if the method of this embodiment is applied to photographing or video recording of the current terminal, the display image of the current terminal displays an image captured by the camera of the current terminal after the switching.

Specifically, in the method of this embodiment, if the image captured by the camera of the current terminal is captured in a video session form, the displaying the image captured by the camera of the current terminal at an angle after the switching includes: displaying, by the current terminal, the image captured by the camera of the current terminal at the angle after the switching, and enabling a video receiving terminal of the video session to display the image captured by the camera of the current terminal at the angle after the switching.

According to the method of this embodiment, a face image may be recognized by a facial recognition system from an image captured by the camera, and then, an angle of a area where the face image is located in the image is adjusted to attain a better display angle of the image and improve user experience.

Figure 4:
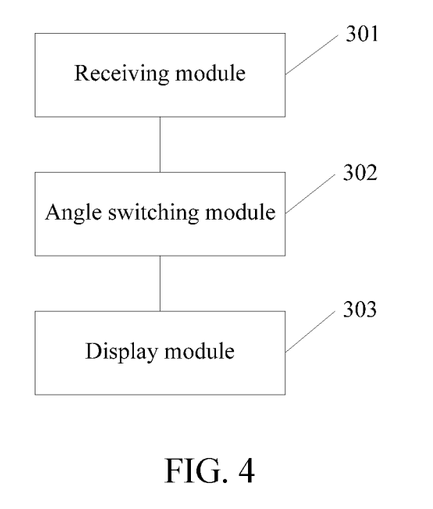
FIG. 4 is a structural block diagram of an angle switching apparatus for an image captured in an electronic terminal according to an embodiment.

FIG. 4 is a structural block diagram of an angle switching apparatus for an image captured in an electronic terminal according to an embodiment of the present disclosure, as shown in FIG. 4, the apparatus of this embodiment may include: a receiving module 301, an angle switching module 302, and a display module 303.

The receiving module 301 is configured to receive a triggering operation input by a user on a specified switching button.

The receiving module 301 may include: a first receiving unit, configured to receive a triggering operation of the user for displaying options; and a second receiving unit, configured to receive an operation of the user for making a selection from the options, where the options include at least two options. For example, the options include a first option for switching a display angle of a face image captured by the camera, a second option for switching a display angle of the entire image captured by the camera, and a third option for switching a display angle of an area selected by the user in the image captured by the camera.

The angle switching module 302 is configured to perform angle switching on an image captured by a camera of a current terminal within a specified angle range according to an image area corresponding to the specified switching button.

Specifically, if the second receiving unit receives the first option selected by the user from the options, the angle switching module 302 performs angle switching on the display angle of the face image captured by the camera within a first specified angle range.

If the second receiving unit receives the second option or the third option selected by the user from the options, the angle switching module 302 performs angle switching on the image captured by the camera of the current terminal within a second specified angle range according to the image area corresponding to the specified switching button.

The display module 303 is configured to display the image captured by the camera of the current terminal at an angle after the switching.

Further, if the image captured by the camera of the current terminal is captured in a video session form, in addition to displaying the image captured by the camera of the current terminal at an angle after the switching, the display module 303 may further enable a video receiving terminal of the video session to display the image captured by the camera of the current terminal at the angle after the switching.

For other details about this embodiment, further refer to the method embodiment shown in FIG. 2, and the details are not repeated herein again.

According to the apparatus of this embodiment, adjusting an angle of an image captured by the camera without changing a position of the camera enables adjusting a display angle of an image without affecting a viewing angle of the image, which improves user experience.

Figure 5:
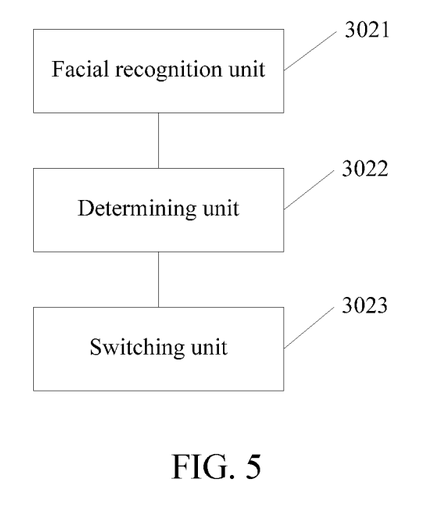
FIG. 5 is a structural block diagram of an angle switching apparatus for an image captured in an electronic terminal according to another embodiment.

FIG. 5 is a structural block diagram of an angle switching apparatus for an image captured in an electronic terminal according to another embodiment. As shown in FIG. 5, this embodiment is similar to the embodiment shown in FIG. 4, and differs from the embodiment shown in FIG. 4 in that: if the second receiving unit receives the first option selected by the user, the angle switching module 302 may include: a facial recognition unit 3021, a determining unit 3022, and a switching unit 3023.

The facial recognition unit 3021 is configured to enable a facial recognition system to perform facial recognition on the image captured by the camera.

The determining unit 3022 is configured to determine whether the facial recognition system successfully performs facial recognition on the image captured by the camera within a specified number of times.

If the determining unit 3022 determines that the facial recognition succeeds, the switching unit 3023 is run, and if the determining unit 3022 determines that the facial recognition fails, the receiving module 301 is run again.

The switching unit 3023 is configured to perform angle switching on a captured face image within the first specified angle range.

For other details about this embodiment, further refer to the method embodiment shown in FIG. 3, and the details are not repeated herein again.

According to the apparatus of this embodiment, a face image may be recognized by a facial recognition system from an image captured by the camera, and then, an angle of the area where the face image is located in the image is adjusted, so as to achieve a better display angle of the image and improve user experience.

In addition, an embodiment of this application further provides a computer readable storage medium, storing computer executable instructions, and for example, the computer readable storage medium may be a non-volatile memory such as an optical disc, a hard disk, or a flash memory. The computer executable instructions are used to enable a computer or a similar computing apparatus to perform various operations in the angle switching method for an image captured in an electronic terminal.

It should be noted that the embodiments in this specification are all described in a progressive manner. Description of each of the embodiments focuses on differences from other embodiments, and reference may be made to each other for the same or similar parts among respective embodiments. The apparatus embodiments are substantially similar to the method embodiments and therefore are only briefly described, and reference may be made to the method embodiments for the associated part.

It should be noted that the relational terms herein such as first and second are used only to differentiate an entity or operation from another entity or operation, and do not require or imply any actual relationship or sequence between these entities or operations. Moreover, the terms "include", "comprise", and any variants thereof are intended to cover a non-exclusive inclusion. Therefore, a process, method, object, or device that includes a series of elements not only includes such elements, but also includes other elements not specified expressly, or may include inherent elements of the process, method, object, or device. Unless otherwise specified, an element limited by "include a/an . . . " does not exclude other same elements existing in the process, the method, the article, or the device that includes the element.

The above descriptions are merely preferred embodiments of this application, and are not intended to limit this application in any form. Although this application has been disclosed above through the preferred embodiments, the embodiments are not intended to limit this application. A person skilled in the art can make some equivalent variations, alterations or modifications to the above-disclosed technical content without departing from the area of the technical solutions of this application to obtain equivalent embodiments. Any simple alteration, equivalent change or modification made to the above embodiments according to the technical essence of this application without departing from the content of the technical solutions of this application shall fall within the scope of the technical solutions of this application.

What is claimed is:

1. An angle switching method for an image captured in an electronic terminal, comprising the following steps:
   receiving a triggering operation on a specified switching button;
   switching an angle on an image captured by a camera of the terminal within a specified angle range to an image area; and displaying the image captured by the camera of the current terminal at an angle after the switching, comprises:
  simulating, by an image processing application, the captured image from a selected angle that is different from an original image capturing angle based on the captured image, a facial images data and a facial image template.

2. The angle switching method for an image captured in an electronic terminal according to claim 1, wherein the receiving a triggering operation on a specified switching button comprises:
  receiving a triggering operation for displaying options; and
  receiving a selection from the options, wherein the options comprise at least two options.

3. The angle switching method for an image captured in an electronic terminal according to claim 2, wherein the options comprise a first option for switching a display angle of a face image captured by the camera.

4. The angle switching method for an image captured in an electronic terminal according to claim 3, wherein the receiving a selection from the options comprise receiving the first option selected from the options; and
  switching the angle on an image captured by a camera of the terminal within a specified angle range according to the image area comprises:
  performing facial recognition on the image captured by the camera; and
  switching an angle on the captured face image within the first specified angle range.

5. The angle switching method for an image captured in the electronic terminal according to claim 4, further comprising:
  if the facial recognition does not detect a face in the image within a specified number of times when performing facial recognition on the image captured by the camera, returning to perform the step of receiving a triggering operation input on a specified switching button.

6. The angle switching method for an image captured in the electronic terminal according to claim 3, wherein the options further comprise a second option for switching a display angle of the entire image captured by the camera, and a third option for switching a display angle of an area selected in the image captured by the camera;
  the receiving a selection from the options comprises receiving the second option or the third option selected by the user from the options; and
  the switching the angle on an image captured by a camera of a current terminal within a specified angle range according to an image area corresponding to the specified switching button comprises: switching the angle on the image captured by the camera of the current terminal within a second specified angle range according to the image area.

7. The angle switching method for an image captured in the electronic terminal according to claim 1, wherein if the image captured by the camera of the current terminal is captured in a video session form, the displaying the image captured by the camera of the current terminal at an angle after the switching comprises:
  displaying, by the current terminal, the image captured by the camera of the current terminal at the angle after the switching, and enabling a video receiving terminal of the video session to display the image captured by the camera of the current terminal at the angle after the switching.

8. An angle switching apparatus for an image captured in an electronic terminal, comprising: a processor and a memory, the memory storing an application program module that can be executed by the processor, when executed by the processor, the application program performs an angle switching method, comprising:
  receiving a triggering operation input on a specified switching button;
  switching an angle on an image captured by a camera of a current terminal within a specified angle range according to an image area; and
  displaying the image captured by the camera of the current terminal at an angle after the switching, comprises:
  simulating, by an image processing application, the captured image from a selected angle that is different from an original image capturing angle based on the captured image, a facial images data and a facial image template.

9. The angle switching apparatus for an image captured in the electronic terminal according to claim 8, the angle switching method comprising:
  receiving a triggering operation for displaying options; and
  receiving a selection from the options, wherein the options comprise at least two options.

10. The angle switching apparatus for an image captured in the electronic terminal according to claim 9, wherein the options comprise a first option for switching a display angle of a face image captured by the camera.

11. The angle switching apparatus for an image captured in the electronic terminal according to claim 10, the method comprising:
  in response to receiving the first option selected, performing facial recognition on the image captured by the camera; and
  switching an angle on a captured face image within the first specified angle range.

12. The angle switching apparatus for an image captured in the electronic terminal according to claim 11, wherein switching the angle further comprises:
  determining whether the facial recognition system successfully performs facial recognition on the image captured by the camera within a specified number of times; and
  switching the angle on the captured face image within the first specified angle range when the determining unit determines that the facial recognition system successfully performs facial recognition on the image captured by the camera within a specified number of times.

13. The angle switching apparatus for an image captured in the electronic terminal according to claim 10, wherein the options further comprise a second option for switching a display angle of the entire image captured by the camera, and a third option for switching a display angle of an area selected in the image captured by the camera.

14. The angle switching apparatus for an image captured in the electronic terminal according to claim 13, the method comprising:
  in response to receiving the second option or the third option selected from the options, switching the angle on the image captured by the camera of the current terminal within a second specified angle range according to the image area corresponding to the specified switching button.

15. The angle switching apparatus for an image captured in the electronic terminal according to claim 8, the method comprising:

if the image captured by the camera of the current terminal is captured in a video session form, enabling a video receiving terminal of the video session to display the image captured by the camera of the current terminal at an angle after switching the angle.

16. The angle switching method for an image captured in an electronic terminal according to claim 1, wherein the electronic terminal hosts the image processing application with the facial image data and the facial image template, the facial image data is collected from the image captured by the camera, the facial image template is a template of a persons' face shape calculated based on the facial image data.

17. The angle switching apparatus for an image captured in the electronic terminal according to claim 8, wherein the electronic terminal hosts the image processing application with the facial image data and the facial image template, the facial image data is collected from the image captured by the camera, the facial image template is a template of a persons' face shape calculated based on the facial image data.

\* \* \* \* \*